No. 721,618. PATENTED FEB. 24, 1903.
G. C. TALLEY.
COTTON CHOPPER.
APPLICATION FILED DEC. 6, 1902.
NO MODEL. 2 SHEETS—SHEET 1.

Witnesses
Edwin G. McKee
Chas. S. Hyer

Inventor
George C. Talley
By Victor J. Evans
Attorney

No. 721,618. PATENTED FEB. 24, 1903.
G. C. TALLEY.
COTTON CHOPPER.
APPLICATION FILED DEC. 6, 1902.
NO MODEL. 2 SHEETS—SHEET 2.
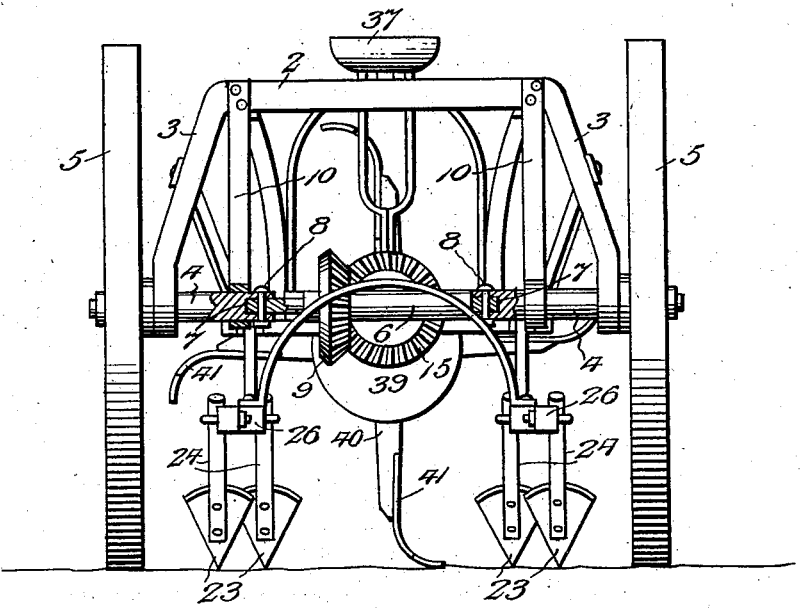
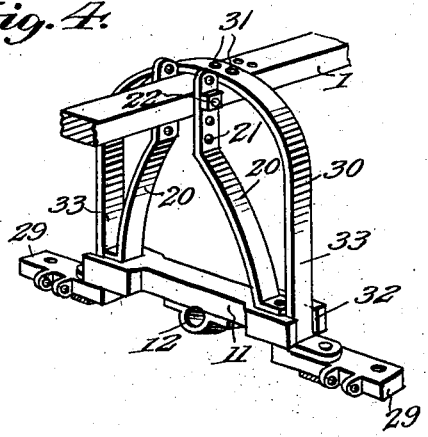
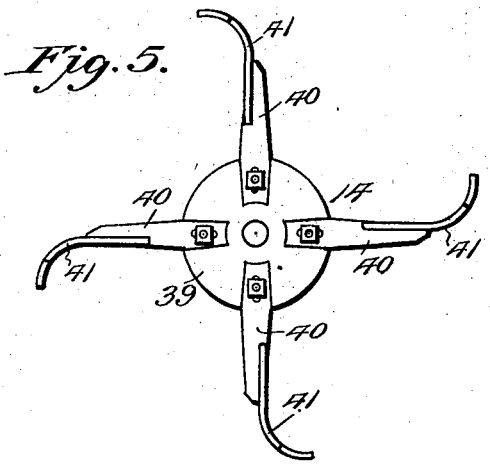
Inventor
George C. Talley
Witnesses
Edwin G. McKee
Chas. S. Hyer.
By Victor J. Evans
Attorney

# UNITED STATES PATENT OFFICE.

GEORGE C. TALLEY, OF HOLLAND, TEXAS.

COTTON-CHOPPER.

SPECIFICATION forming part of Letters Patent No. 721,618, dated February 24, 1903.

Application filed December 6, 1902. Serial No. 134,121. (No model.)

*To all whom it may concern:*

Be it known that I, GEORGE C. TALLEY, a citizen of the United States, residing at Holland, in the county of Bell and State of Texas, have invented new and useful Improvements in Cotton-Choppers, of which the following is a specification.

This invention relates to cotton-choppers, having for its object to provide a machine adapted to be drawn across a field and embodying a rotary chopper which thins or cuts out the plants and simultaneously cultivates the soil adjacent thereto, said machine being convertible from a cotton-chopper to an ordinary cultivator.

It is also an object of this invention to provide simple and effective means for quickly and readily adjusting the height and sweep of the rotary chopper and also the depth of penetration of the cultivator-shovels, additional means being provided whereby the chopper may be lifted clear of the ground when not needed in use or when passing an obstruction, so as to prevent injury to the cultivating-shovels. The shovel adjustment may be independently made, so that one part of the machine is not affected by the adjustment of another part.

With the above and other objects in view, the nature of which will more fully appear as the description proceeds, the invention consists in the novel construction, combination, and arrangement of parts as hereinafter fully described, illustrated, and claimed.

Figure 1:
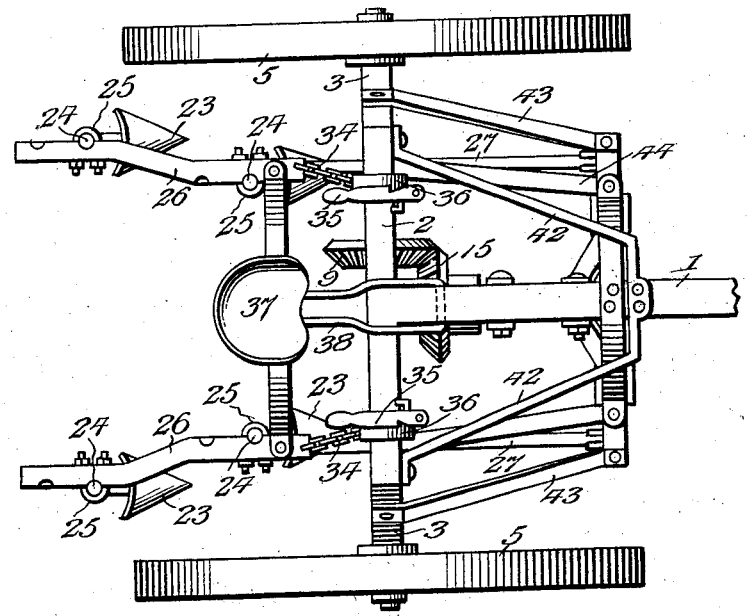
Figure 2:
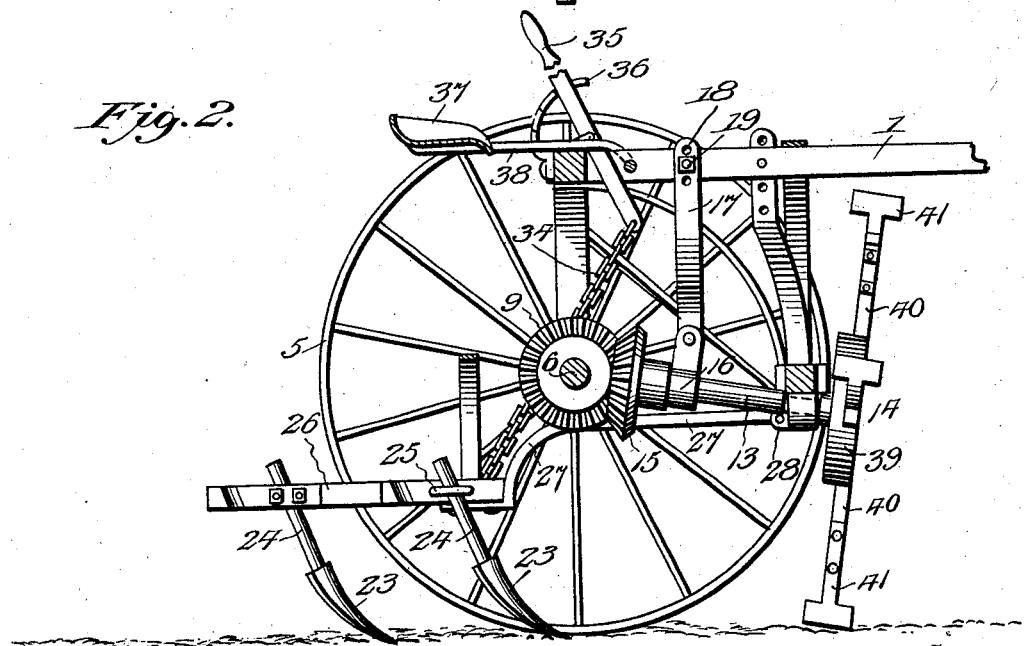

In the accompanying drawings, Figure 1 is a plan view of a combined cotton chopper and cultivator constructed in accordance with the present invention. Fig. 2 is a vertical longitudinal section through the same. Fig. 3 is a rear elevation of the machine, showing the main axle partly in section. Fig. 4 is a detail perspective view of the adjustable hanger, yoke, and beam-carrying extensions, showing the relation of said parts to each other and to the machine-tongue. Fig. 5 is a view in elevation of the rotary chopper.

Like reference-numerals designate corresponding parts in all the figures of the drawings.

Referring to the drawings, 1 designates the machine-tongue, which is rigidly connected at its rear end to an arch 2, forming part of the machine-frame, the said arch comprising pendent end portions 3, in which the main axle 4 is journaled, said axle having the carrying-wheels mounted upon the ends thereof outside of the arch 2. The axle 4 is sectional in construction, comprising end portions, to which the numeral 4 is applied, and an intermediate separable section 6, the extremities of which are received in sockets 7 in the sections 4 and are removably secured therein by means of bolts or other suitable fastenings 8, thus enabling the intermediate section 6, together with the beveled gear-wheel 9, mounted thereon, to be removed whenever desired. The inner ends of the axle-sections 4 are further supported by means of axle-braces 10, extending from the upper portion of the arch 2 downward and embracing said axle-sections, as clearly shown in Fig. 3, thus imparting steadiness and strength to the machine as a whole and preventing the wabbling of the axle-sections 4 and the wheels 5, mounted thereon.

11 designates what I term a "hanger-bar," which is located in front of the axle 4 and is provided with an obliquely disposed or inclined bearing 12 to receive the shaft 13 of the rotary chopper 14. The shaft 13 extends from the bearing 12 rearward, where it is provided with a beveled gear-wheel 15, meshing with the gear-wheel 9 on the axle 6, whereby the said axle is adapted to impart rotary motion to the shaft 13 of the rotary chopper, causing said chopper to revolve in a direction transverse to the path of movement of the machine across the field. The rear end of the shaft 13 is also supported in a bearing 16, upheld by means of one or more hanger-straps 17, extending upward on opposite sides of the machine-tongue 1 and provided with a series of holes 18, adapted to receive a detachable bolt 19, whereby the strap or straps 17 are secured to the tongue 1 and made adjustable up and down for varying the height and inclination of the shaft 13 for the purpose hereinafter described.

The hanger-bar 11 is supported by means of upwardly-converging hangers 20, the upper ends of which extend on opposite sides of the tongue 1 and are provided with a series of holes 21, adapted to receive a bolt 22, which is fitted removably to the tongue 1, whereby said hangers may be adjusted up and down for varying the height of the hanger-bar 11.

Operating in rear of the axle 4 are two sets of shovels 23, the shanks 24 of which are adjustable up and down in clips 25, secured to a pair of curved beams 26. These beams are provided with upwardly-curving and forwardly-projecting extensions 27, which at their forward ends are pivotally connected at 28 to a pair of oppositely-projecting beam-carrying extensions 29. The extensions 29 are arranged below the plane of the hanger-bar 11 and are connected by means of an arched yoke 30, which extends upward over and across the tongue 1, as clearly illustrated in Fig. 4, the said yoke being secured to the tongue at 31. The end portions of the hanger-bar 11 are notched or slotted, as shown at 32, to straddle and engage the upright portions 33 of the yoke 30. This connection between the hanger-bar and the yoke serves to brace the hanger-bar against movement fore and aft, while at the same time permitting the said hanger-bar to be adjusted up or down by means of the bolt 22, as above described.

Chains or other flexible connections 34 are attached at one end to the pivotally-mounted cultivator-beams 26 and are attached at their opposite ends to a pair of shovel-adjusting levers 35, pivotally mounted on the machine-frame and adapted to engage with segment-racks 36, whereby said levers may be held in any adjusted position. The means just described provides for raising and lowering the cultivator-beams and regulating the depth of penetration of the same, also enabling the shovels to be lifted clear of the ground, as in passing over an obstruction.

37 represents the driver's seat, supported upon a suitable seat-standard 38 and connected with the machine-frame.

Secured to the forward end of the shaft 13 is the chopper 14, which comprises a disk-shaped head 39, to which are connected radially-adjustable arms 40, carrying chopping-blades 41. The space between the blades 41 is such that the requisite number of plants are missed and left standing, while the others are cut and the row of cotton-plants thus thinned to the necessary extent.

42 represents a tongue-brace interposed between the tongue and arch 2, and 43 and 44 represent braces which connect the beam-carrying extensions with the arch 2.

By removing a few bolts it will be observed that the cotton-chopper and the parts intimately associated therewith may be removed from the machine, thus adapting the machine to be used as an ordinary cultivator, also that the cultivator-beams and the shovels carried thereby may be adjusted up and down to any desired extent; further, that the rotary chopper may be adjusted up and down to suit requirements by means of the bolts 19 and 22, the hanger-bar 11 being adapted to slide up and down on the yoke 30 to admit of such adjustment. The vertical adjustment of the chopper does not interfere in the slightest with the operation of the machine, as the chopper-shaft 13 is maintained in proper alinement with the main axle 4 to insure the proper intermeshing between the gear-wheels 9 and 15.

It will be apparent that the machine hereinabove described is susceptible of changes in the form, proportion, and minor details of construction which may be accordingly resorted to without departing from the principle or sacrificing any of the advantages of this invention.

Having thus described the invention, what is claimed as new, and desired to be secured by Letters Patent, is—

1. A convertible cotton chopper and cultivator comprising a machine-frame, a tongue, one or more cultivator-beams hung from the tongue, cultivator adjusting-levers fulcrumed on the machine-frame and flexibly connected with the beams, a rotary chopper geared to the main axle in advance of the cultivator-beams, and means for adjusting said chopper up and down independent of the cultivating device, whereby the cultivating device carried by the beams and the said rotary chopper may be elevated or depressed relatively to each other to simultaneously chop and cultivate cotton-plants, substantially as described.

2. A convertible cotton chopper and cultivator, a tongue rigidly connected therewith, a downwardly and forwardly inclined shaft extending longitudinally of the machine and having a rotary chopper mounted thereon, said shaft being geared to and driven by the main axle of the machine, and adjustable hangers interposed between the chopper-shaft and the machine-tongue whereby the chopper may be raised and lowered, the said hangers having downwardly and forwardly inclined bearings for the chopper-shaft, substantially as described.

3. A convertible cotton chopper and cultivator comprising a machine-frame, a tongue rigidly connected therewith, a rotary cotton-chopper having a shaft extending at right angles to the main axle of the machine and geared thereto, an arched yoke, a vertically-adjustable hanger-bar engaging said yoke and movable up and down thereon and provided with a bearing for the chopper-shaft, and means for adjusting said hanger-bar vertically, substantially as described.

4. A convertible cotton chopper and cultivator comprising a machine-frame, a tongue rigidly connected therewith, a rotary cotton-chopper having its shaft extended at right angles to the main axle and geared thereto, a vertically-adjustable hanger-bar in which the chopper-shaft is supported, said hanger-bar being terminally and slidingly engaged with the yoke, and adjustable hangers interposed between the hanger-bar and machine-tongue.

5. A convertible cotton chopper and cultivator comprising a machine-frame, a tongue rigidly connected therewith, a rotary cotton-chopper having its shaft arranged at right angles to the main axle and geared thereto, a vertically-adjustable hanger-bar, supporting said chopper-shaft and provided with slotted or notched end portions to embrace the sides of the yoke, and hangers connected with said hanger-bar and adjustably associated with the machine-tongue, substantially as described.

6. A convertible cotton chopper and cultivator comprising a machine-frame, a tongue connected therewith, an arch forming a part of the machine-frame, a sectional main axle on which the carrying-wheels are mounted, said axle comprising end sections and an intermediate section detachably coupled with the end sections, axle-braces supporting the inner portions of the end sections of the axle from the arch, a rotary chopper having its shaft arranged at right angles to the main axle, means for vertically adjusting said chopper and its shaft, and beveled gears on the chopper-shaft and intermediate section of the main axle, substantially as and for the purpose described.

In testimony whereof I affix my signature in presence of two witnesses.

GEORGE C. TALLEY.

Witnesses:
J. M. FINLEY,
J. W. PEARCE.